(12) United States Patent
Johnson et al.

(10) Patent No.: US 10,934,878 B2
(45) Date of Patent: Mar. 2, 2021

(54) CMC LOOP BOAS

(71) Applicant: United Technologies Corporation, Farmington, CT (US)

(72) Inventors: Dean W. Johnson, Springvale, ME (US); Thomas E. Clark, Snaford, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 371 days.

(21) Appl. No.: 16/210,215

(22) Filed: Dec. 5, 2018

(65) Prior Publication Data

US 2020/0182077 A1 Jun. 11, 2020

(51) Int. Cl.
F01D 11/08 (2006.01)

(52) U.S. Cl.
CPC .......... F01D 11/08 (2013.01); F05D 2240/55 (2013.01); F05D 2300/6033 (2013.01)

(58) Field of Classification Search
CPC ........ F01D 11/08; F01D 25/246; F01D 25/24; F01D 25/28; F01D 11/12; F01D 11/122; F01D 11/125; F01D 11/127; F05D 2240/55; F05D 2300/6033; F05D 2240/11; Y10T 29/49872; Y10T 29/49321; Y10T 29/49323
See application file for complete search history.

(56) References Cited

U.S. PATENT DOCUMENTS

| | | | | |
|---|---|---|---|---|
| 6,884,026 B2* | 4/2005 | Glynn | ............... | F01D 11/08 415/113 |
| 8,814,507 B1* | 8/2014 | Campbell | ............... | F01D 25/14 415/173.1 |
| 8,834,105 B2* | 9/2014 | Albers | ............... | F01D 25/12 415/173.1 |
| 9,267,388 B2 | 2/2016 | Mizokami et al. | | |
| 10,094,234 B2* | 10/2018 | O'Leary | ............... | F01D 11/08 |
| 10,132,194 B2* | 11/2018 | Vetters | ............... | F01D 25/12 |
| 10,801,349 B2* | 10/2020 | McCaffrey | ............... | F01D 25/24 |
| 2013/0170963 A1* | 7/2013 | Mironets | ............... | F01D 11/12 415/173.1 |
| 2016/0215645 A1* | 7/2016 | McCaffrey | ............... | F01D 11/08 |
| 2017/0175572 A1* | 6/2017 | Vetters | ............... | F01D 25/12 |
| 2018/0251921 A1 | 9/2018 | Shi | | |
| 2019/0316480 A1* | 10/2019 | Smiddy | ............... | F01D 11/08 |
| 2019/0316481 A1* | 10/2019 | Rugg | ............... | F01D 25/246 |

(Continued)

FOREIGN PATENT DOCUMENTS

| | | |
|---|---|---|
| EP | 2631434 | 8/2013 |
| EP | 3115561 | 1/2017 |
| WO | 20150031764 | 3/2015 |

OTHER PUBLICATIONS

EP Extended Search Report for EP Application No. EP19213872.5 dated Feb. 19, 2020.

Primary Examiner — J. Todd Newton

(74) Attorney, Agent, or Firm — Carlson, Gaskey & Olds, P.C.

(57) ABSTRACT

A blade outer air seal includes a base portion that extends between a first circumferential side and a second circumferential side. A first wall is circumferentially spaced from a second wall. The first and second wall extend outward from the base portion and are connected by an outer wall to define a passage that extends in a generally axial direction along the base portion.

17 Claims, 9 Drawing Sheets

(56) References Cited

U.S. PATENT DOCUMENTS

| | | | |
|---|---|---|---|
| 2020/0063592 A1* | 2/2020 | Barker | F01D 25/246 |
| 2020/0094447 A1* | 3/2020 | Blaney | F01D 9/04 |
| 2020/0095893 A1* | 3/2020 | Blaney | F01D 25/246 |
| 2020/0131921 A1* | 4/2020 | Johnson | F01D 11/08 |
| 2020/0131939 A1* | 4/2020 | Johnson | F01D 11/14 |
| 2020/0149477 A1* | 5/2020 | Barker | F02C 7/28 |
| 2020/0173299 A1* | 6/2020 | Barker | F01D 11/122 |
| 2020/0182077 A1* | 6/2020 | Johnson | F01D 25/246 |
| 2020/0182078 A1* | 6/2020 | Johnson | F01D 11/08 |
| 2020/0191007 A1* | 6/2020 | Barker | F01D 25/246 |
| 2020/0224544 A1* | 7/2020 | Barker | F01D 25/243 |
| 2020/0224555 A1* | 7/2020 | Clark | F01D 25/28 |

* cited by examiner

US 10,934,878 B2

CMC LOOP BOAS

BACKGROUND

This application relates to a ceramic matrix composite blade outer air seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal includes a base portion that extends between a first circumferential side and a second circumferential side. A first wall is circumferentially spaced from a second wall. The first and second wall extend outward from the base portion and are connected by an outer wall to define a passage that extends in a generally axial direction along the base portion.

In a further embodiment of the above, the outer wall has slot.

In a further embodiment of any of the above, the slot is rectangular.

In a further embodiment of any of the above, the base portion extends circumferentially outward of the first and second walls.

In a further embodiment of any of the above, the second circumferential side has a mating feature that extends generally radially outward from the base portion.

In a further embodiment of any of the above, the mating feature extends circumferentially beyond the base portion to form a hook that is configured to engage with the first circumferential side of an adjacent blade outer air seal.

In a further embodiment of any of the above, the mating feature has a width in the axial direction that is smaller than a width of the base portion.

In a further embodiment of any of the above, the outer wall has a width in the axial direction that is smaller than a width of the base portion in the axial direction.

In a further embodiment of any of the above, a ratio of the outer wall width to the base portion width is greater than about 0.5.

In a further embodiment of any of the above, the blade outer air seal is formed from a plurality of ceramic matrix composite laminates.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure and arranged circumferentially about the axis of rotation and radially outward of the outer tip. Each segment has a first wall circumferentially spaced from a second wall. The first and second walls are joined by a base portion and an outer wall to define a passage that extends axially along the segment.

In a further embodiment of any of the above, the outer wall has a slot. The support structure is configured to engage the slot.

In a further embodiment of any of the above, the slot is rectangular.

In a further embodiment of any of the above, a portion of the support structure is within the passage.

In a further embodiment of any of the above, the base portion extends axially forward and aft of the outer wall to define a leading edge and a trailing edge.

In a further embodiment of any of the above, each segment has a first and second circumferential side. The second circumferential side has a mating feature that extends generally radially outward from the base portion.

In a further embodiment of any of the above, the mating feature of each segment engages with the first circumferential side of an adjacent segment.

In a further embodiment of any of the above, the outer wall has a width in the axial direction that is smaller than a width of the base portion in the axial direction.

In a further embodiment of any of the above, a ratio of the outer wall width to the base portion width is greater than about 0.5.

In a further embodiment of any of the above, the blade outer air seal is formed from a ceramic matrix composite.

These and other features may be best understood from the following drawings and specification.

DETAILED DESCRIPTION

Figure 1:
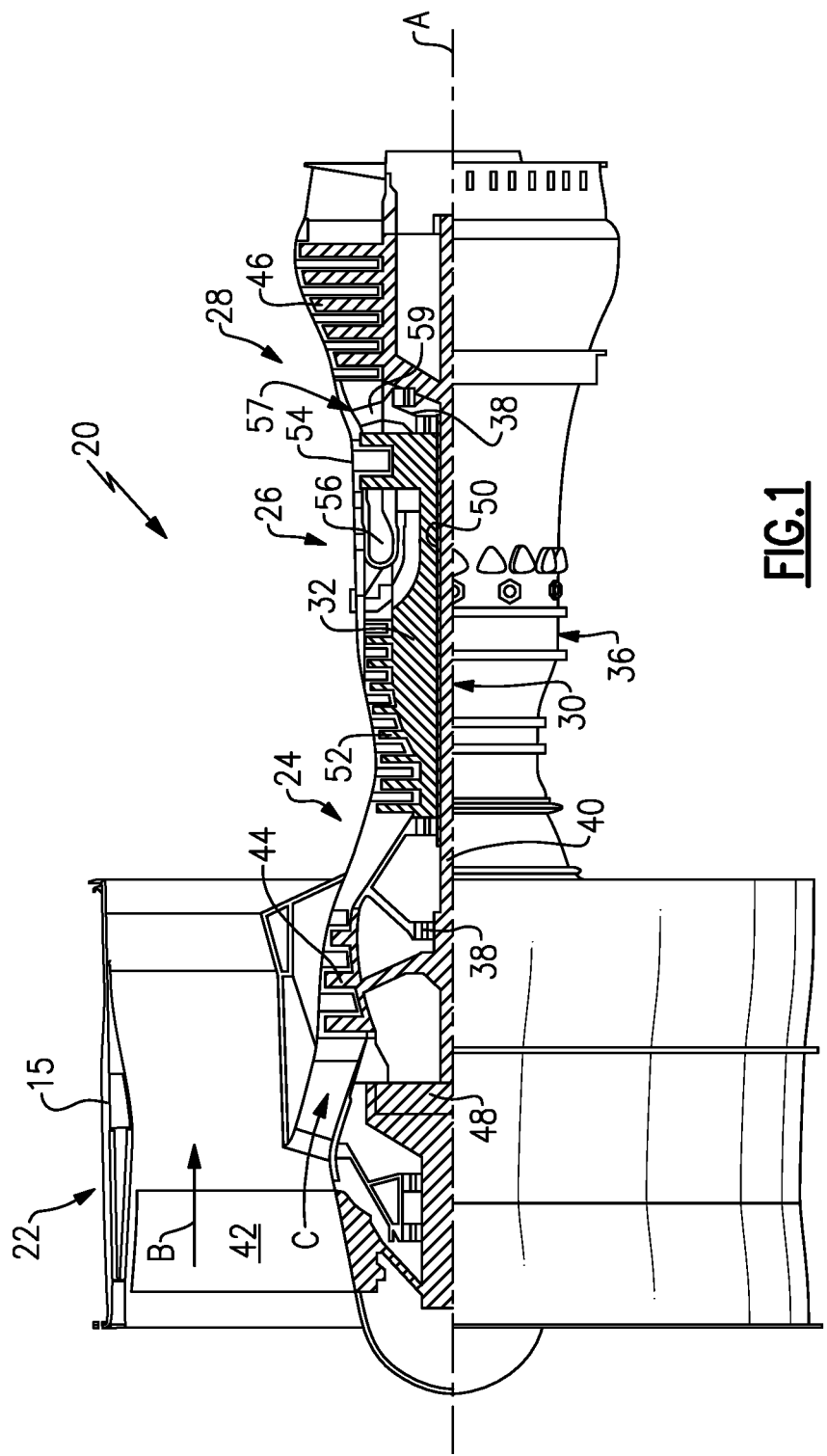
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
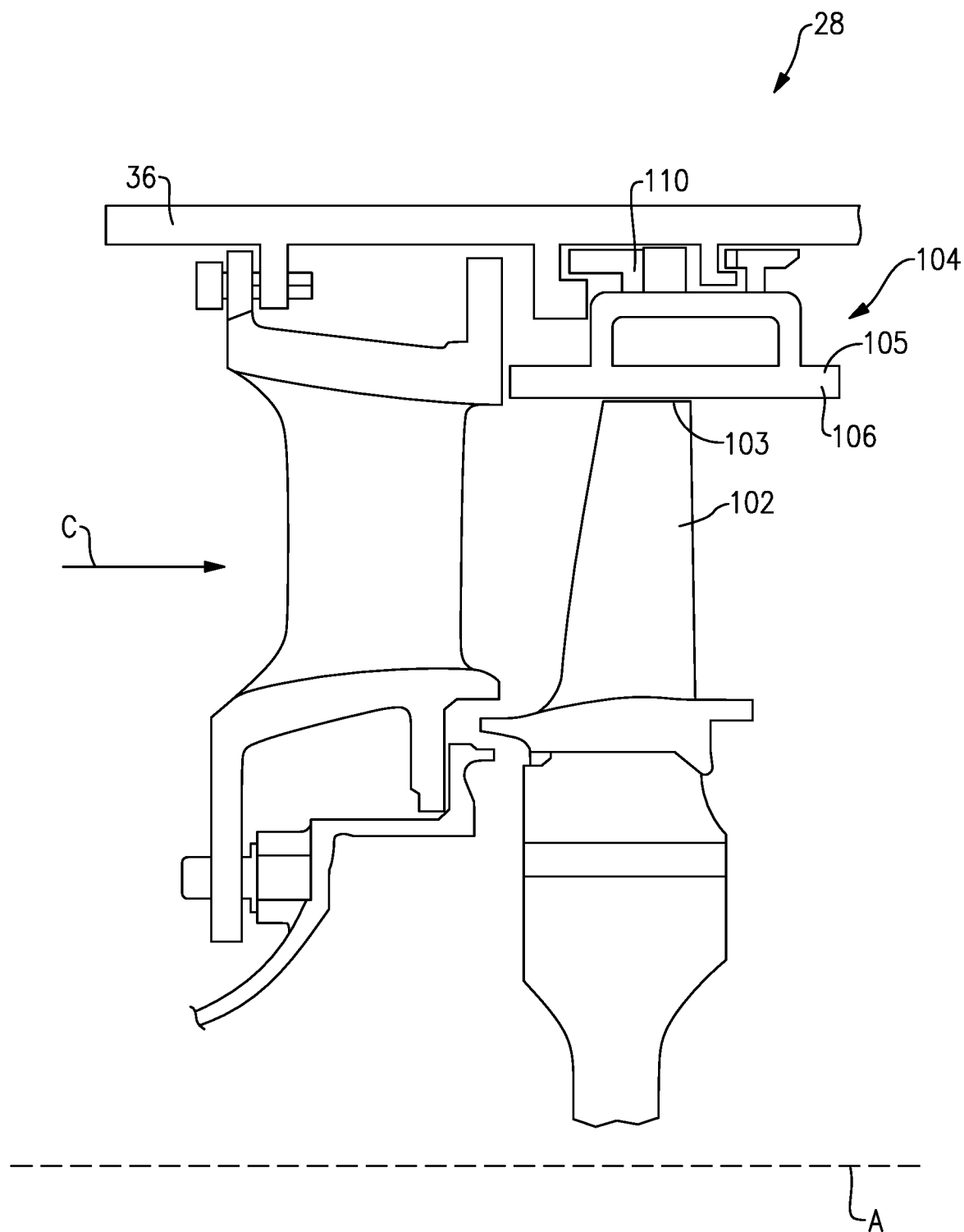
FIG. 2 shows a turbine section.

FIG. 2 shows a portion of a turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS seal segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110. The engine structure 36 may extend for a full 360° about the engine axis A. The engine structure 36 may support the support structure 110 via a hook or other attachment means.

Figure 3A:
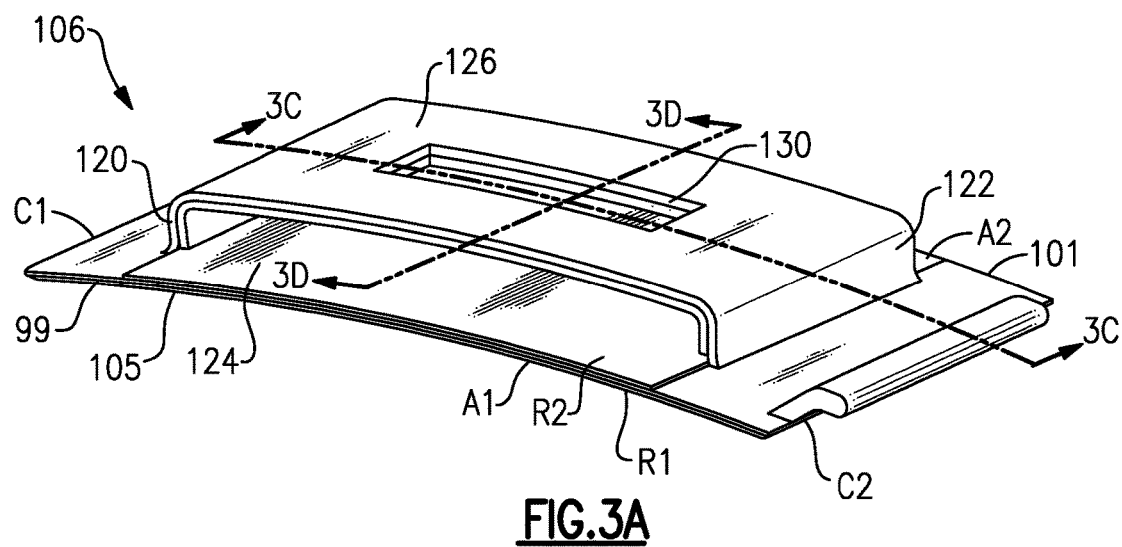
FIG. 3A shows an exemplary blade outer air seal.

FIGS. 3A-3D illustrate an exemplary BOAS seal segment 105. As can be seen in FIG. 3A, each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). That is, the first axial side A1 corresponds to a leading edge 99, and the second axial side A2 corresponds to a trailing edge 101.

In the illustrated example, the BOAS seal segment 105 includes a first circumferential wall 120 and a second circumferential wall 122 that extend radially outward from a base portion 124. The base portion 124 extends between the leading edge 99 and the trailing edge 101 and defines a gas path on a radially inner side and a non-gas path on a radially outer side. An outer wall 126 extends between the first and second circumferential walls 120, 122. The outer wall 126 includes a generally constant thickness and constant position in the radial direction such that an outer surface of the outer wall 126 is generally planar. In this disclosure, forward, aft, upstream, downstream, axial, radial, or circumferential is in relation to the engine axis A unless stated otherwise. The base portion 124 extends circumferentially outward of the first and second walls 120, 122, and provides a flat surface for sealing of the BOAS leading and trailing edges 99, 101.

The first circumferential wall 120, the second circumferential wall 122, the outer wall 126, and the base portion 124 of the BOAS seal segment 105 define a passage 128 for accepting the support structure 110. The passage 128 extends along the seal segment 105 in an axial direction. The outer wall 126 includes a slot 130 for securing the BOAS seal segment 105 to the support structure 110. The slot 130 prevents rotation of the BOAS seal segments 105 after assembly. In the illustrated embodiment, the slot 130 is rectangular. However, others slot shapes may come within the scope of this disclosure, such as round or oblong slots. Further, although a single slot 130 is illustrated, multiple slots on a single seal segment 105 may come within the scope of this disclosure.

Figure 3B:
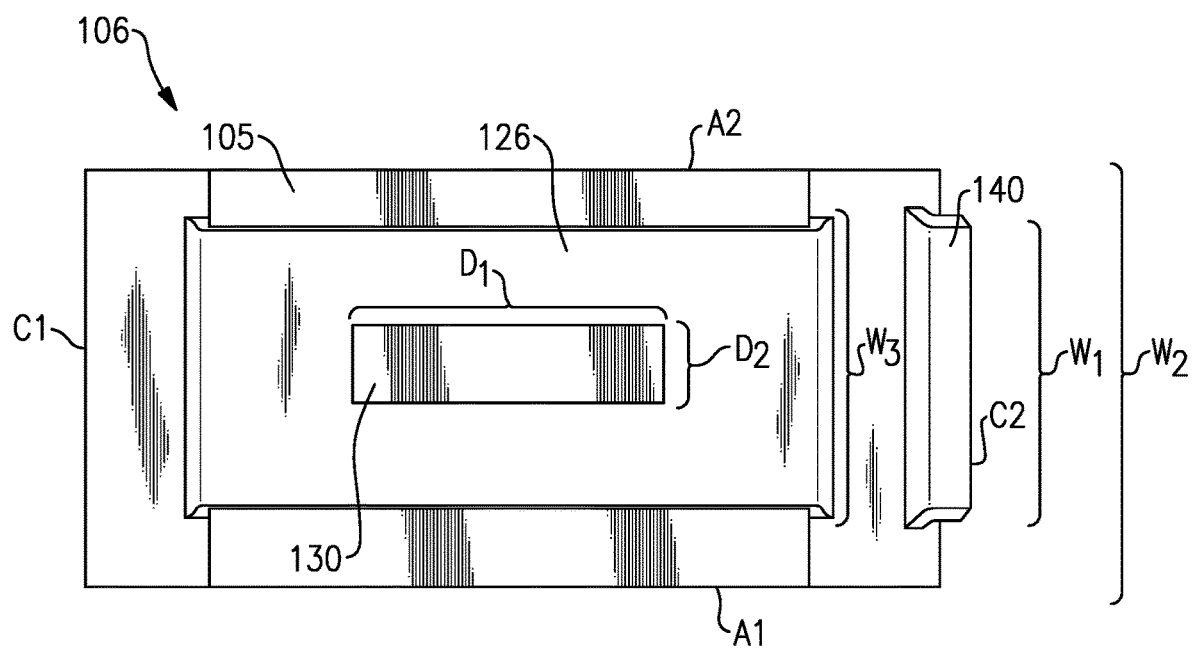
FIG. 3B shows a top view of a blade outer air seal.
Figure 3C:
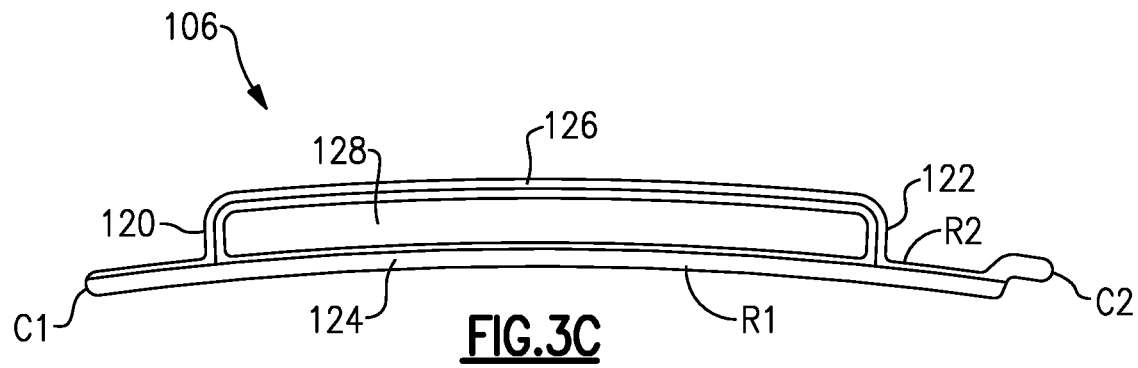
FIG. 3C shows a cross section of a blade outer air seal.
Figure 3D:
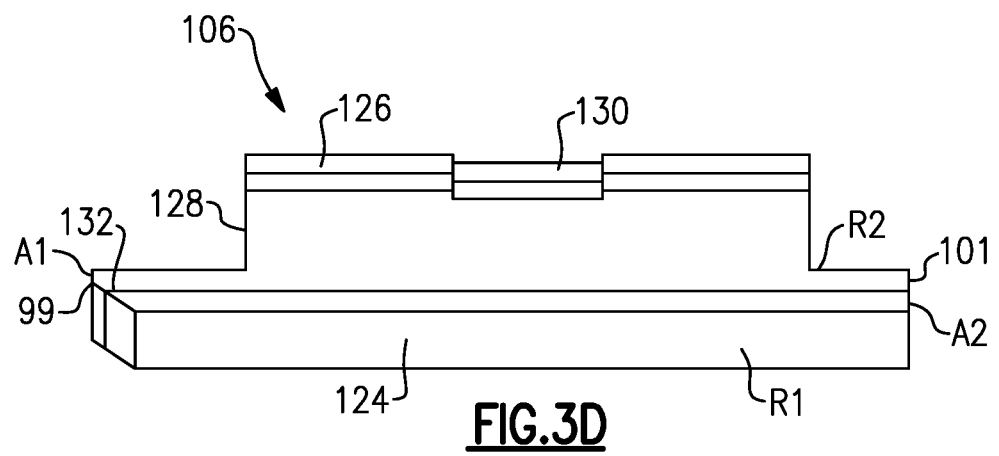
FIG. 3D shows a cross section of a blade outer air seal.
Figure 4:
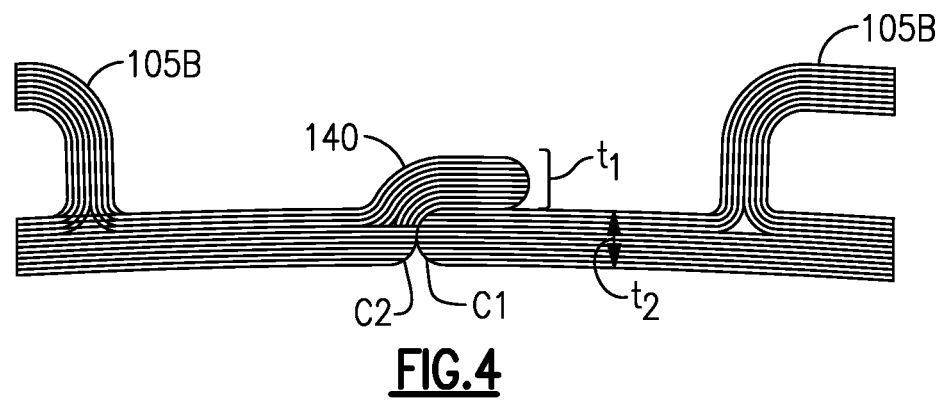
FIG. 4 shows a detail of a blade outer air seal.

As is shown in FIG. 4, and with continuing reference to FIGS. 3A-3D, the second circumferential side C2 includes a mating feature 140. The mating feature 140 extends radially outward from the base portion 124. The mating feature 140 also extends circumferentially beyond the seal segment 105A to form a hook that engages with a neighboring seal segment 105B. This mating feature 140 engages with an adjacent seal segment 105B in a "shiplap" manner. The mating feature 140 limits radial openings from the gas path. In some embodiments, a feather seal may be used instead of the mating feature 140 between circumferential ends C1, C2 of adjacent seal segments 105A, 105B. In further embodiments, a feather seal may be used in combination with the mating feature 140 for sealing between circumferential ends C1, C2 of adjacent seal segments 105A, 105B.

As shown in FIG. 3B, the mating feature 140 has a width $w_1$ in the axial direction that may be smaller than a width $w_2$ of the base portion 124 in the axial direction. In some embodiments, the width $w_1$ is equal to the width $w_2$. The outer wall 126 has a width $w_3$ in the axial direction. In an embodiment, the width $w_1$ is about the same as the width $w_3$. The outer wall width $w_3$ is smaller than the base portion width $w_2$. In an example, a ratio of the outer wall width $w_3$ to the base portion width $w_2$ is greater than about 0.5. In an embodiment, the mating feature 140 has a thickness $t_1$ that is the same as a thickness $t_2$ of the base portion 124.

Figure 5A:
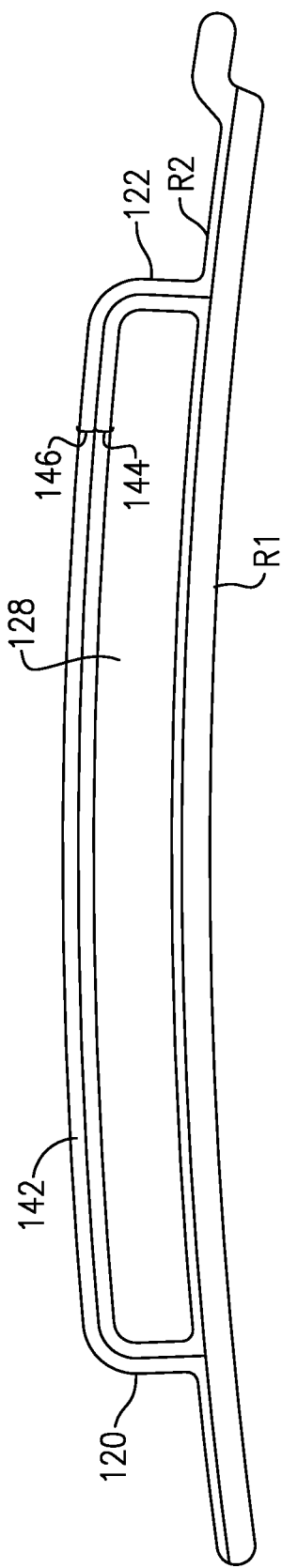
FIG. 5A shows a cross section of a blade outer air seal.
Figure 5B:
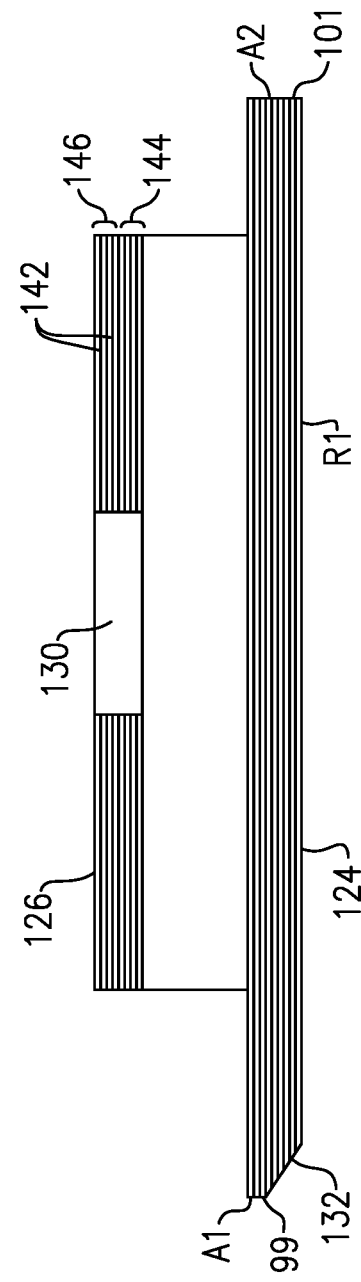
FIG. 5B shows a cross section of a blade outer air seal.
Figure 5C:
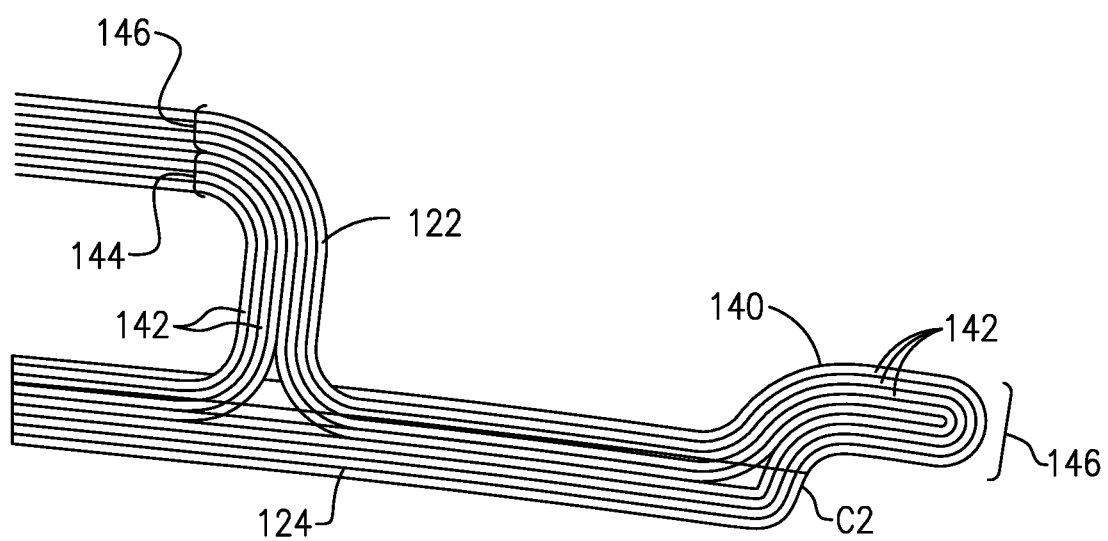
FIG. 5C shows a cross-section of a detail of a blade outer air seal.

As shown in further detail in FIGS. 5A-5C, the BOAS 106 is formed of a ceramic matrix composite ("CMC") material. Each BOAS seal segment 105 is formed of a plurality of CMC laminates 142. The laminates 142 may be silicon carbide fibers, formed into a woven fabric in each layer. The fibers may be coated by a boron nitride. In other examples, the BOAS 106 may be made of a monolithic ceramic.

CMC components such as a BOAS 106 are formed by laying fiber material, such as laminate sheets, in tooling, injecting a liquid resin into the tooling, and curing to form a solid composite component. The component may be densified by adding additional material to further stiffen the laminates.

In an embodiment, the BOAS seal segment 105 is formed from two loops of CMC laminated plies. A center or first loop 144 defines the passage 128. The first loop 144 comprises the inner-most layers relative to the passage 128. In one example embodiment, the first loop 144 is formed from four laminated plies 142. The first loop 144 may be formed from laminates being wrapped around a core mandrel. The second loop 146 is formed about the first loop 144. The second loop 146 forms the outermost layers relative to the passage 128. The second loop 146 also forms the first and second circumferential sides C1, C2 circumferentially past the first and second walls 120, 122. In one example embodiment, the second loop 146 is formed from four laminated plies 142.

In an example embodiment, the BOAS seal segment 105 has a constant wall thickness of about 9 laminated plies, with each plie having a thickness of about 0.011 inches (0.279 mm). This structure may reduce thermal gradient stress. Although 9 laminated plies are illustrated, BOAS constructed of more or fewer plies may fall within the scope of this disclosure.

As shown in FIG. 5C, the mating feature 140 on the second circumferential side C2 is formed of laminate plies 142. The mating feature 140 is formed of laminate plies 142 in the second loop 146. The mating feature 140 is integrally formed with the base portion 124.

Figure 6A:
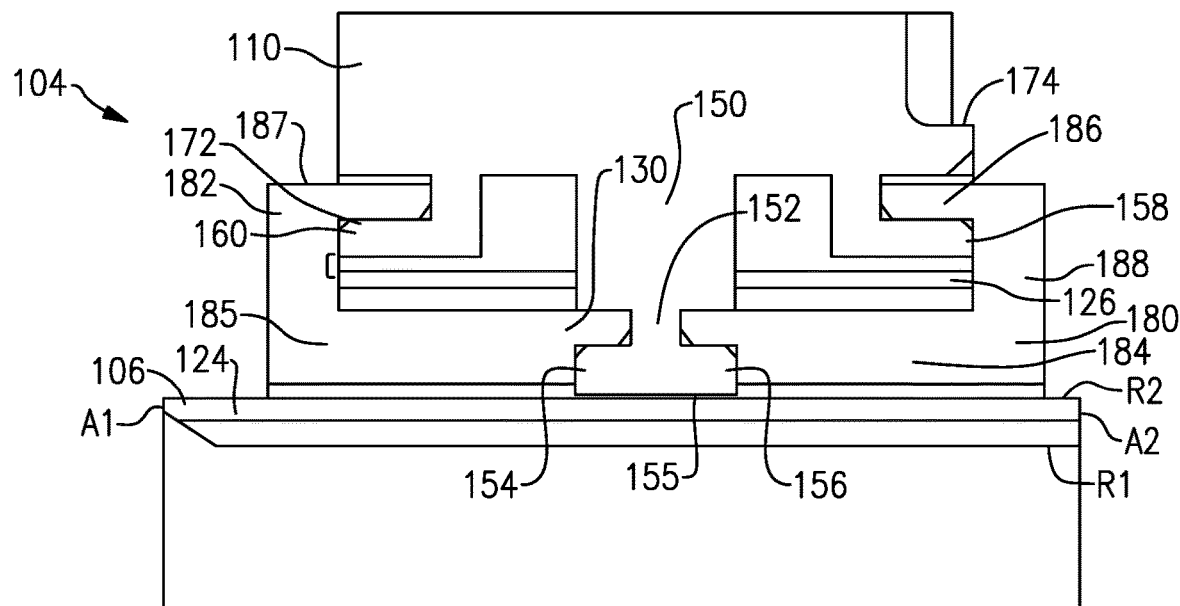
FIG. 6A shows an exemplary blade outer air seal assembly.
Figure 6B:
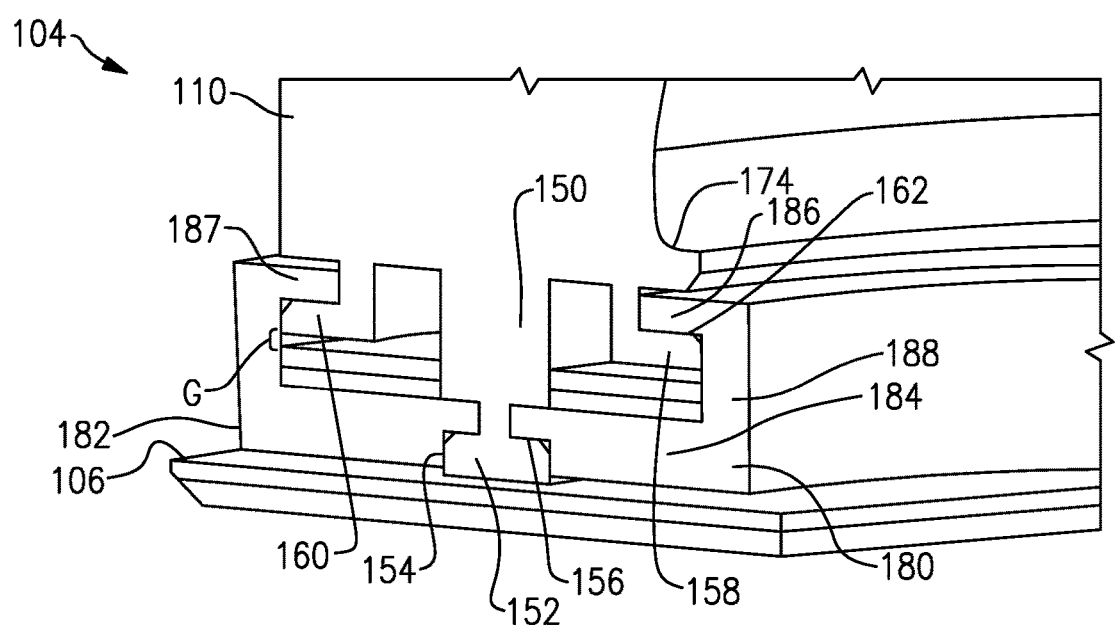
FIG. 6B shows an exemplary blade outer air seal assembly.

As shown in FIGS. 6A-6B, the BOAS 106 is mounted to the engine via an support structure 110. The support structure 110 extends circumferentially about the engine central axis A, and holds the BOAS 106 radially outward of the turbine blades 102.

The support structure 110 has an attachment member 150 extending radially inward for engagement with the BOAS 106. The attachment member 150 has a narrow portion 152 that extends radially inward, and first and second portions 154, 156 that extend axially forward and aft of the narrow portion 152, respectively. The first and second portions 152, 154 form an anti-rotation feature 155 that corresponds to the shape of the slot 130. For example, the anti-rotation feature 155 may be rectangular to fit within a rectangular slot 130. The structure 110 has a plurality of discrete attachment members 150 circumferentially spaced about the structure 110. In an embodiment, there are an equal number of attachment members 150 as BOAS seal segments 105. However, in some embodiments, a seal segment 105 may have more than one slot 130, and thus additional attachment members 150 may be used.

The narrow portion 152 and first and second portions 154, 156 are configured to engage with retaining rings 180, 182. The support structure 110 also has an aft hook 158 and a forward hook 160. The forward hook 160 is axially forward of the attachment member 150, while the aft hook is axially aft of the attachment member 150. The aft and forward hooks 158, 160 are configured to engage with the retaining rings 180, 182. The hooks 158, 160 have a radially inwardly extending portion and an axially extending portion that forms a hook. In an embodiment, the hooks 158, 160 may be a continuous structure circumferentially about the support structure 110.

The support structure 110 may have a notch 174 on one of the forward and aft sides. The notch 174 ensures the support structure 110 cannot be installed backwards into the turbine section 28.

The first retaining ring 180 has a radially inner portion 184 that engages the passage 128 of the BOAS seal segment 105, and a radially outer portion 186 connected by a radially extending portion 188. The radially inner portion 184, radially outer portion 186, and radially extending portion 188 generally form a "C" shape. The second retaining ring 182 has the same shape. In one embodiment, a single part can be used for both the first and second retaining rings 180, 182. That is, a common part number is used, and the part is simply rotated and inserted from the opposite side. The retaining ring 180, 182 could be a full ring or could have a plurality of segments arranged circumferentially about the engine central axis A.

When the BOAS 106 is assembled into the support structure 110 with the retaining rings 180, 182, a gap G may be formed between the BOAS seal segment 105 and the hooks 158, 160 of the support structure 110. The gap G is formed immediately radially outward of the upper wall 126 of the seal segment 105. This gap G is formed when the retaining rings 180, 182 are installed such that there is contact between the radially outer portions 186, 187 of the retaining rings 180, 182 and the hooks 158, 160.

Figure 7:
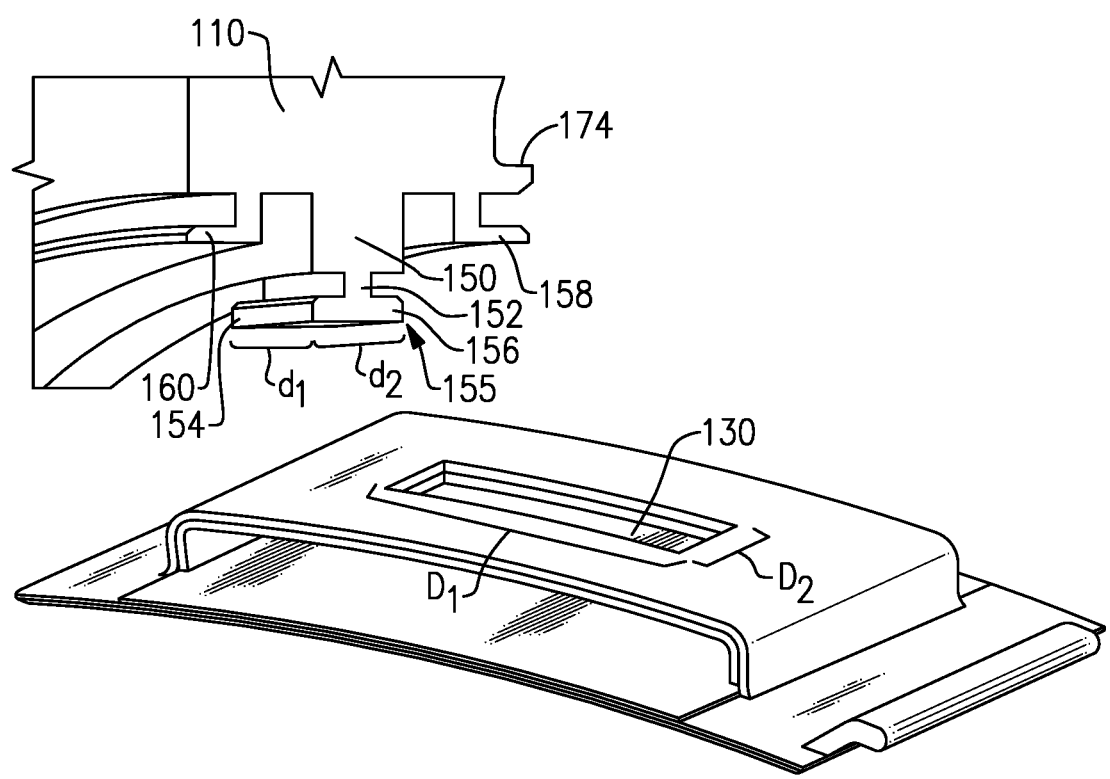
FIG. 7 shows a portion of an exemplary blade outer air seal assembly.

As shown in FIG. 7, the support structure 110 has discrete radially inwardly extending portions. In this example, the portions 152, 154, 156 together form these discrete radially inwardly extending portions. The first and second portions 154, 156 form an anti-rotation feature 155 that corresponds to the shape of the slot 130. The illustrated rectangular anti-rotation feature 155 has a distance $d_1$ that is a length in the circumferential direction and a distance $d_2$ that is a length in the axial direction. The slot 130 has a length $D_1$ in the circumferential direction and a length $D_2$ in the axial direction. The distance $d_1$ is slightly smaller than the length $D_1$ and the distance $d_2$ is slightly smaller than the length $D_2$ to accommodate insertion of the anti-rotation feature 155 into the slot 130.

Figure 8A:
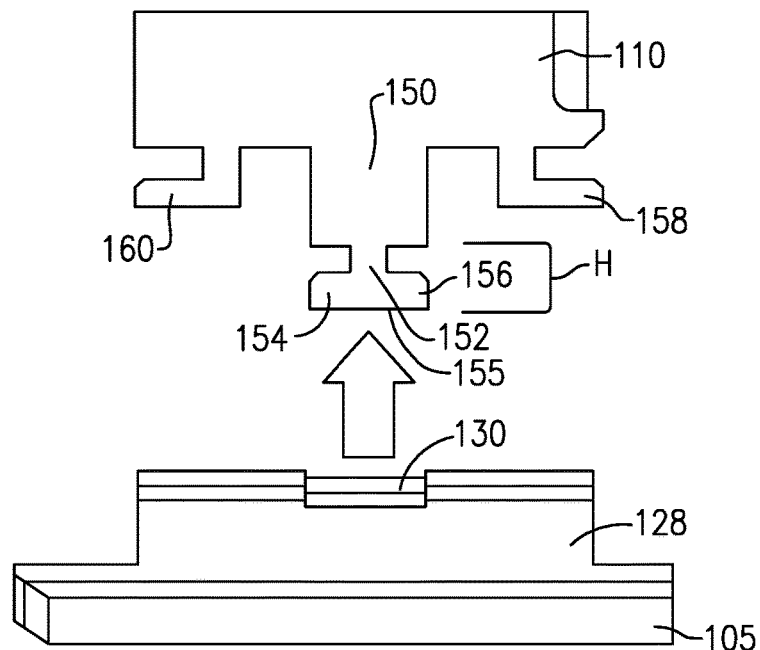
FIG. 8A shows a method step of assembling a blade outer air seal assembly.
Figure 8B:
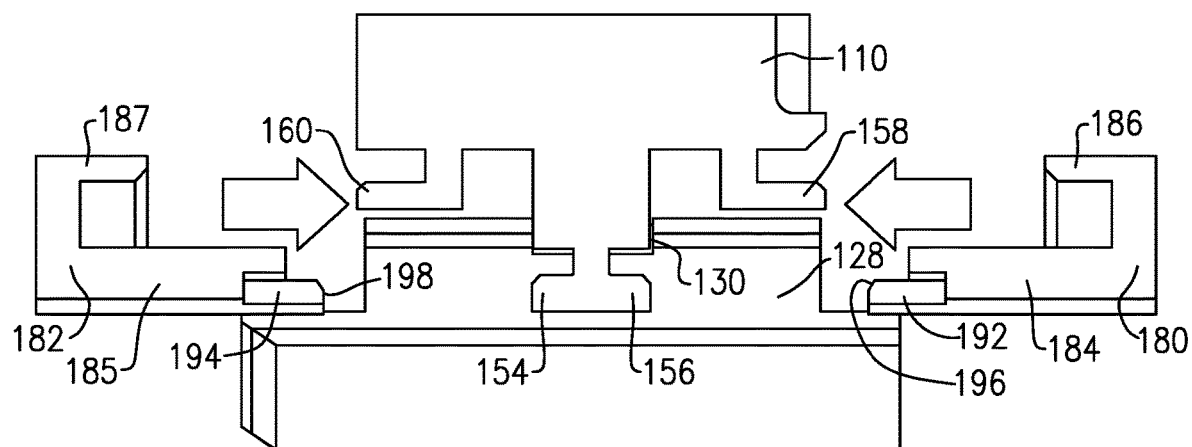
FIG. 8B shows a subsequent method step of assembling a blade outer air seal assembly.

A method of assembling the BOAS assembly 104 is illustrated in FIGS. 8A-8B. As shown, in FIG. 8A, a BOAS seal segment 105 is moved radially onto the support structure 110. The anti-rotation feature 155 fits into the slot 130. When moved into place, the anti-rotation feature 155 and narrow portion 152 are entirely within the passage 128.

Then, as shown in FIG. 8B, the retaining rings 180, 182 are axially moved into place. The retaining ring 180 is moved axially forward and engages the BOAS seal segment 105 and the support structure 110 at an aft side. The retaining ring 182 is moved axially aft and engages the BOAS seal segment 105 and the support structure 110 at a forward side. When the retaining rings 180, 182 are moved axially into place, the radially inner portions 184, 185 are within the passage 128. The radially outer portions 186, 187 are engaged with hooks 158, 160 of the support structure 110.

The retaining ring 180 has an axially outer portion 196 with a notch 192 (shown in FIG. 8B). The retaining ring 182 has an axially outer portion 198 with a notch 194. When the retaining rings 180, 182 are installed, the axially outer portions 196, 198 contact one another, while the notches 192, 194 accommodate the attachment member 150 of the support structure 110. That is, the first portion 154 fits into the notch 194, while the second portion 156 fits into the notch 192.

Known CMC BOAS require a large contact area with supports while also having few radial features to minimize thermal gradients. Known CMC BOAS may also require support designs that are complicated to manufacture. The disclosed hollow BOAS structure with an access slot allows for radial installation and retaining clips from both the front and back sides. This construction allows a larger contact area, permitting lower deflection and reduced stresses. The radial installation of the BOAS assembly allows each BOAS segment to have three or four attachment points, rather than two. This permits lower stresses because of increased contact area. This is particularly beneficial for ceramic BOAS because ceramic materials are not as ductile as metallic materials. The ability to use ceramic BOAS promotes a more stable assembly.

Some known CMC BOAS have three or more radially protruding portions. The disclosed loop BOAS has the first and second walls 120, 122. This configuration of only two radial portions reduces the thermal gradient stresses throughout the BOAS 106. The disclosed CMC BOAS has simple features that are easily manufactured using CMC laminates.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
   a base portion extending between a first circumferential side and a second circumferential side; and
   a first wall circumferentially spaced from a second wall, the first and second wall extending outward from the base portion and connected by an outer wall to define a passage extending in a generally axial direction along the base portion, and wherein the second circumferential side has a mating feature that extends generally radially outward from the base portion wherein the mating feature extends circumferentially beyond the base portion to form a hook that is configured to engage with the first circumferential side of an adjacent blade outer air seal.

2. The blade outer air seal of claim 1, wherein the outer wall has a slot.

3. The blade outer air seal of claim 2, wherein the slot is rectangular.

4. The blade outer air seal of claim 1, wherein the base portion extends circumferentially outward of the first and second walls.

5. The blade outer air seal of claim 1, wherein the mating feature has a width in the axial direction that is smaller than a width of the base portion.

6. The blade outer air seal of claim 1, wherein the outer wall has a width in the axial direction that is smaller than a width of the base portion in the axial direction.

7. The blade outer air seal of claim 6, wherein a ratio of the outer wall width to the base portion width is greater than 0.5.

8. The blade outer air seal of claim 1, wherein the blade outer air seal is formed from a plurality of ceramic matrix composite laminates.

9. A turbine section for a gas turbine engine, comprising:
   a turbine blade extending radially outwardly to a radially outer tip and for rotation about an axis of rotation;
   a blade outer air seal having a plurality of segments mounted in a support structure and arranged circumferentially about the axis of rotation and radially outward of the outer tip; and
   wherein each segment has a first wall circumferentially spaced from a second wall, the first and second walls joined by a base portion and an outer wall to define a passage that extends axially along the segment with respect to the axis of rotation wherein the outer wall has a slot, and the support structure is configured to engage the slot.

10. The turbine section of claim 9, wherein the slot is rectangular.

11. The turbine section of claim 9, wherein a portion of the support structure is within the passage.

12. The turbine section of claim 9, wherein the base portion extends axially forward and aft of the outer wall to define a leading edge and a trailing edge.

13. The turbine section of claim 9, wherein each segment has a first and second circumferential side, and the second circumferential side has a mating feature that extends generally radially outward from the base portion.

14. The turbine section of claim 13, wherein the mating feature of each segment engages with the first circumferential side of an adjacent segment.

15. A tubing section for a gas turbine engine, comprising:
   a turbine blade extending radially outwardly to a radially outer tip and for rotation about an axis of rotation;
   a blade outer air seal having a plurality of segments mounted in a support structure and arranged circumferentially about the axis of rotation and radially outward of the outer tip; and
   wherein each segment has a first wall circumferentially spaced from a second wall, the first and second walls joined by a base portion and an outer wall to define a passage that extends axially along the segment with respect to the axis of rotation, wherein the outer wall has a width in the axial direction that is smaller than a width of the base portion in the axial direction.

16. The turbine section of claim 9, wherein a ratio of the outer wall width to the base portion width is greater than 0.5.

17. The turbine section of claim 9, wherein the blade outer air seal is formed from a ceramic matrix composite.

\* \* \* \* \*